United States Patent
Borello et al.

(10) Patent No.: US 11,656,970 B2
(45) Date of Patent: May 23, 2023

(54) PROGRAMMATIC CONTAINER MONITORING

(71) Applicant: SYSDIG, INC., San Francisco, CA (US)

(72) Inventors: Gianluca Borello, Davis, CA (US); Loris Degioanni, Davis, CA (US)

(73) Assignee: Sysdig, Inc., San Francisco, CA (US)

( * ) Notice: Subject to any disclaimer, the term of this patent is extended or adjusted under 35 U.S.C. 154(b) by 0 days.

(21) Appl. No.: 17/577,302

(22) Filed: Jan. 17, 2022

(65) Prior Publication Data

US 2022/0138079 A1 May 5, 2022

Related U.S. Application Data

(60) Continuation of application No. 16/783,099, filed on Feb. 5, 2020, now Pat. No. 11,226,886, which is a division of application No. 15/959,153, filed on Apr. 20, 2018, now Pat. No. 10,592,380.

(51) Int. Cl.

| | | |
|---|---|---|
| *G06F 9/455* | (2018.01) | |
| *G06F 11/34* | (2006.01) | |
| *G06F 9/50* | (2006.01) | |
| *G06F 9/54* | (2006.01) | |
| *G06F 21/57* | (2013.01) | |
| *G06F 8/41* | (2018.01) | |

(52) U.S. Cl.
CPC ............ *G06F 11/3466* (2013.01); *G06F 8/43* (2013.01); *G06F 9/45558* (2013.01); *G06F 9/5077* (2013.01); *G06F 9/544* (2013.01); *G06F 9/545* (2013.01); *G06F 21/57* (2013.01); *G06F 2009/45591* (2013.01)

(58) Field of Classification Search
CPC .... G06F 11/3466; G06F 8/43; G06F 9/45558; G06F 9/5077; G06F 9/544; G06F 9/545; G06F 21/57; G06F 2009/45591
See application file for complete search history.

(56) References Cited

U.S. PATENT DOCUMENTS

| | | |
|---|---|---|
| 9,916,233 B1 | 3/2018 | Qureshi et al. |
| 10,592,380 B2 | 3/2020 | Borello |
| 10,606,646 B1 | 3/2020 | Christensen |
| 10,922,072 B1 | 2/2021 | Chouinard |
| 2009/0165132 A1 | 6/2009 | Jain et al. |

(Continued)

OTHER PUBLICATIONS

Borello, U.S. Appl. No. 16/783,099, filed Feb. 5, 2020, Office Action, dated Jul. 29, 2021.

(Continued)

*Primary Examiner* — Gregory A Kessler
(74) *Attorney, Agent, or Firm* — Hickman Becker Bingham Ledesma LLP

(57) ABSTRACT

A computer-implemented method of monitoring programmatic containers (containers) through executing a computer program in a kernel space is disclosed. The method comprises storing trace data in a memory buffer that is shared by the kernel space and a user space, the trace data being related to execution of a process associated with a container at an execution point of the process. The method also comprises retrieving container data related to the container through raw access of one or more kernel data structures when execution of the process is stopped. In addition, the method comprises storing the container data in association with the trace data in the memory buffer.

20 Claims, 5 Drawing Sheets

(56) References Cited

U.S. PATENT DOCUMENTS

| | | |
|---|---|---|
| 2011/0138389 A1 | 6/2011 | Molnar et al. |
| 2014/0013434 A1 | 1/2014 | Ranum et al. |
| 2014/0115703 A1 | 4/2014 | Penton et al. |
| 2015/0244734 A1 | 8/2015 | Olson et al. |
| 2016/0099960 A1 | 4/2016 | Gerritz et al. |
| 2016/0205002 A1 | 7/2016 | Rieke et al. |
| 2016/0357618 A1 | 12/2016 | Degioanni et al. |
| 2017/0098072 A1 | 4/2017 | Stopel et al. |
| 2018/0048545 A1 | 2/2018 | Mishalov |
| 2018/0183764 A1 | 6/2018 | Gunda |
| 2018/0295036 A1 | 10/2018 | Krishnamurthy et al. |
| 2018/0357068 A1 | 12/2018 | Ambichl et al. |
| 2018/0359264 A1 | 12/2018 | Sweet et al. |
| 2019/0311130 A1 | 10/2019 | Hodgman et al. |
| 2019/0324882 A1 | 10/2019 | Borello et al. |
| 2020/0174905 A1 | 6/2020 | Borello |
| 2020/0265134 A1 | 8/2020 | Cristina et al. |
| 2020/0396240 A1 | 12/2020 | Flaherty et al. |
| 2021/0042217 A1 | 2/2021 | Hwang et al. |
| 2021/0089647 A1 | 3/2021 | Suwad et al. |
| 2021/0097037 A1 | 4/2021 | Babol et al. |
| 2021/0144168 A1 | 5/2021 | Vester et al. |
| 2021/0192046 A1 | 6/2021 | Levin et al. |
| 2021/0211450 A1 | 7/2021 | Aleidan |
| 2021/0226981 A1 | 7/2021 | Huffman et al. |
| 2021/0344703 A1 | 11/2021 | Barajas et al. |

OTHER PUBLICATIONS

Borello, U.S. Appl. No. 16/783,099, filed Feb. 5, 2020, Notice of Allowance and Fees Due, dated Nov. 17, 2021.

Borello, U.S. Appl. No. 15/959,153, filed Apr. 20, 2018, Notice of Allowance, dated Dec. 10, 2019.

Borello, U.S. Appl. No. 15/959,153, filed Apr. 20, 2018, Restriction Requirement, dated Oct. 24, 2019.

Github.com, "Pod Metrics", https://github.com/kubernetes/kube-state-metrics/blob/master/docs/pod-metrics.md, retrieved May 5, 2022, 9 pages.

Docs.Sysdig.com, "Run PromQL Queries Faster with Extended Label Set", https://docs.sysdig.com/en/docs/sysdig-monitor/metrics-dictionary/metrics-and-label-mapping/run-promql-queries-faster-with-extended-label-set/, retrieved May 5, 2022, 5 pages.

Berger, Andreas, "Dynatrace Application Security protects your applications in complex cloud environments", Dynatrace news, Dec. 8, 2020, 18 pages.

"What is Kubernetes?", https://kubernetes.io/docs/concepts/overview/what-is-kubernetes/, last modified Jul. 23, 2021, 3 pages.

"Vulnerability Management", Sysdig, Sysdig Secure, Feature Brief, https://sysdig.com/wp-content/uploads/2019/01/vulnerability-management.pdf, 2019, 2 pages.

"Runtime vulnerability detection", Dynatrace Hub, https://www.dynatrace.com/hub/detail/runtime-vulnerability-detection/, printed Dec. 13, 2021, 1 page.

"Pods", Kubernates, https://kubernetes.io/docs/concepts/workloads/pods/, last modified Oct. 17, 2021, 6 pages.

PROGRAMMATIC CONTAINER MONITORING

BENEFIT CLAIM

This application claims the benefit under 35 U.S.C. § 120 as a Continuation of application Ser. No. 16/783,099, filed Feb. 5, 2020, which is a Divisional of application Ser. No. 15/959,153, filed Apr. 20, 2018, now U.S. Pat. No. 10,592,380 B2, issued on Mar. 17, 2020, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

FIELD OF THE DISCLOSURE

The present disclosure generally relates to the technical area of computer process monitoring. The disclosure relates more specifically to monitoring of processes within programmatic containers through in-kernel instrumentation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Programmatic containers ("containers") encapsulate computer program applications within individual, relatively isolated runtime environments. For example, a container may bundle into a single package an application program with its dependencies, libraries, and configuration files. Thus, containers enable portability across different operating systems and different hardware environments. In other words, containers provide many of the benefits of virtual machine instances. At the same time, containers use significantly fewer resources than virtual machine instances. For example, a container may be several megabytes in size, whereas a virtual machine instance may be several gigabytes in size.

One reason for this difference is that a container uses the operating system kernel of its host computer, whereas a virtual machine instance includes an entire operating system that runs on top of the operating system kernel of its host computer. This lightweight aspect of containers makes them popular alternatives to virtual machine instances for developing computer program applications. For example, a computer program application may be deployed at one or more times as a set of containers. Furthermore, each container may include a set of code that exhibits simplified dependencies and/or is otherwise streamlined for performance efficiency.

However, the isolated nature of a container renders current approaches to visibility of software applications inefficient. As a monitored application runs inside a container while a monitoring component typically lives outside that container, gathering information regarding execution of the monitored application may not be straightforward. Even when such information is available to the monitoring component, correctly associating such information with a container to which such information pertains can be challenging.

The use of the operating system kernel by a container also requires more system security protection than offered by current approaches to visibility of software applications. A monitoring component is typically implemented as a kernel module, which can easily cause a complete system failure.

Therefore, it would be helpful to find an alternative instrumentation method that provides high-quality process execution data that allows full introspection of the monitored application without sacrificing the security of the host system.

SUMMARY

The appended claims may serve as a summary of the disclosure.

BRIEF DESCRIPTION OF THE DRAWINGS

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

In the drawings.

DETAILED DESCRIPTION

Figure 1:
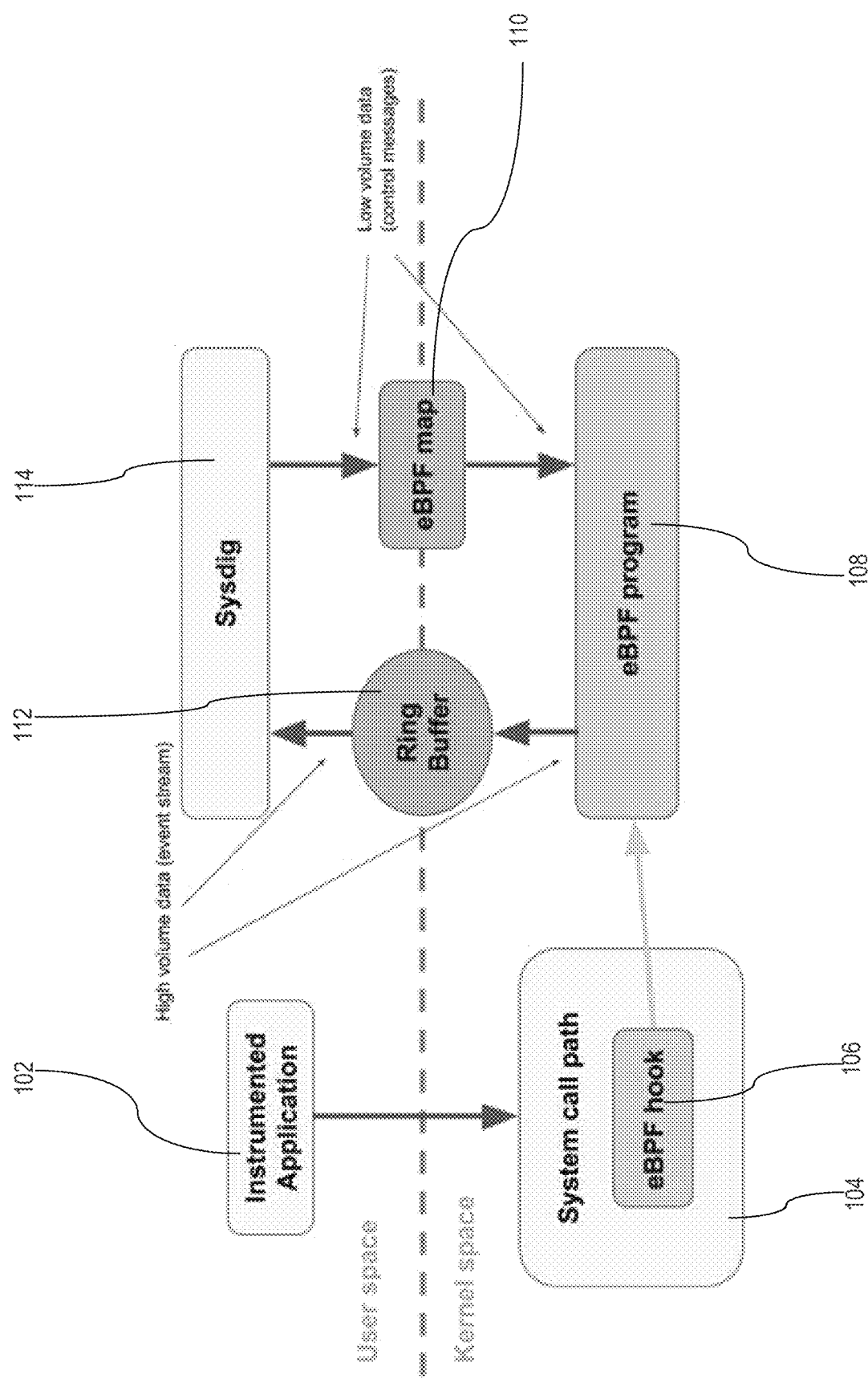
FIG. 1 illustrates an example computing architecture for monitoring a container application comprising a monitoring component in communication with a virtual machine.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

Embodiments are described herein according to the following outline:

1.0 General Overview
    2.0 Example Computing Architecture
    3.0 Example Computer Components
    4.0 Example Processes
    5.0 Implementation Example—Hardware Overview
    6.0 Extensions and Alternatives
    1.0 General Overview A monitoring system for monitoring applications or processes within containers ("container application" or "container process") and related methods are disclosed. The monitoring system is programmed or configured to execute a monitoring component that safely generates high-quality trace data regarding execution of container processes through in-kernel instrumentation.

In some embodiments, the monitoring component running in the user space communicates with a virtual machine that has a custom set of instructions and verifies a computer program written in the virtual machine code before running the computer program in the kernel space. The monitoring component selects one or more execution points from which trace data is to be gathered. For example, one execution point could be the entry or exit of a system call. The monitoring component then causes one or more computer programs written in virtual machine code to be loaded into the virtual machine. The one or more computer programs are to be attached to the one or more execution points. The one or more computer programs can contain similar instructions, or they can contain different instructions specific to individual execution points. Through the attachment, the monitoring component can further cause the one or more computer programs compiled into kernel code to be executed in the kernel space when running applications, including container applications, reach the one or more execution points during their execution.

In some embodiments, each of the computer programs stores trace data related to execution of a container application or process that has triggered execution of the computer program. For example, when the execution point is the entry of a system call, the trace data could include arguments to the system call. The trace data could also include additional contextual information related to memory counters, page faults, socket queues, and so on. In addition, as container data related to the container of the container application or process is not typically included in the call stack for the computer program running in the kernel space, the computer program could obtain such container data via direct access of certain kernel data structures without causing invalid memory access. The computer program could save the trace data and the container data in one or more memory buffers directly managed by the kernel and shared by the kernel space and the user space for retrieval by the monitoring component. An example of such a memory buffer is a per-CPU ring buffer large enough to accommodate all the trace data and container data generated by the one or more computer programs during execution of the container application or process.

In some embodiments, the monitoring component retrieves data stored by the one or more computer programs in the one or more memory buffers. The monitoring component can associate trace data with proper containers, compute various metrics from the trace data, and generate container-specific trace reports containing the trace data or the various metrics in response to requests from user devices.

The monitoring system has many technical benefits. Gathering data at all selected execution points and recording the gathered data tends to lead to higher-granularity data than conventional approaches that only take snapshots of running processes periodically. In addition, direct attachment to execution points without having to hook into different low-level kernel subsystems tends to reduce overhead to monitored applications. Direct attachment to execution points without having to modify a monitored application also offers a non-invasive solution.

Moreover, execution of computer programs that collect trace data in the kernel space through a virtual machine that verifies safe execution and offers additional safe memory access routines provides a high level of safety protection. Furthermore, with the proper selection of execution points, the retrieval of container data, and the computation of specific metrics, the monitoring system produces container-specific, high-quality trace reports helpful for troubleshooting, monitoring, and security auditing purposes in container environments.

2.0 Example Computing Architecture

In some embodiments, the monitoring component communicates with or includes a virtual machine that runs safe computer programs on behalf of a user in the kernel space. The virtual machine exposes to the user a virtual processor, with a custom set of virtual machine instructions as well as a set of registers and a stack memory area. Upon receiving a computer program using the custom set of instructions ("virtual machine program"), the virtual machine verifies that the code satisfies certain safety criteria, such as the absence or proper termination of functional loops or the absence of invalid memory access. The verification can include simulating the execution of the computer program one instruction at a time within the virtual machine. On the other hand, the kernel allows computer programs to be attached to various execution points to receive relevant data coming from the execution points. For example, a computer program can be attached to a system call invoked by any monitored application running in the user space. When the monitored application invokes the system call, the computer program can be run in the kernel to receive arguments to the system call. The virtual machine then allows a virtual machine program attached to an execution point to be executed directly in the kernel when an application or process reaches the execution points. The virtual machine would typically cause compilation of the computer program into the kernel code before running the computer program directly in the kernel. The virtual machines can ensure that the monitored process is stopped while the computer program is run to minimize the probability of reading corrupted data without requiring locking synchronization.

In some embodiments, the virtual machine enables a computer program running in the kernel space to communicate with the monitoring component through one or more memory spaces shared by the kernel space and the user space, at least one large enough for storing select trace data concerning execution of a container application. For example, the computer program can initially store data in a smaller memory space as temporary storage and later move data to a larger memory space according to specific schedules or in response to specific triggers, such as the smaller memory space getting full. The computer program could also reserve the smaller memory space for passing low-volume data, such as control messages, and utilize the larger memory space for general event streaming. One type of control messages specifies enabling or disabling instrumentation for specific subsets of kernel events. For example, the control message may specify a criterion to a computer program attached to the entry point of a system call such that the computer program is to collect data only at the entry point of a system call that satisfies the criterion. Another type of control messages controls the amount of data capture for certain types of data sources. For example, for a system call that directly performs file or network I/O (e.g., read/write), the I/O buffers passed to the system call might contain the contents being written or other useful payloads. The control message may instruct a computer programmed attached to the entry point of a system call to capture a specific portion of such contents (e.g., the first few bytes) to strike a balance between obtaining useful information and maintaining reasonable execution time.

Furthermore, the virtual machine offers memory access functions that correctly protect against the fatal consequences of accessing invalid memory while in the kernel space In some embodiments, the monitoring component causes loading of one or more computer programs to the virtual machine and attachment of these one or more computer programs to one or more execution points. The monitoring component can also store control messages in the one or more memory spaces for retrieval by the one or more computer programs, as discussed above. The monitoring component can retrieve data saved by the attached computer programs in the one or more memory spaces upon request, according to a specific schedule, or in response to certain triggers. The monitoring component can further analyze the retrieved data and report the retrieved data or analysis results to a user device.

For example, the Linux operating system allows the insertion of a tracepoint into the kernel code, which is generally a placeholder function that would call a callback function, passing its arguments that contain kernel data to be traced near the insertion point as if the callback function was called with those arguments. In other words, the callback function is called each time the tracepoint is executed, in the execution context of the caller. As the tracepoint and the callback function run in the kernel space, the callback function typically copies the arguments into a memory in the kernel space that can at least be mapped to a user space. Therefore, a computer program written for a virtual machine could be attached to the tracepoint. Similarly, the Linux operating system allows the dynamic insertion of a kprobe in a debugging mode, which represents a breakpoint placed on a certain instruction address. A kprobe is generally associated with a set of handlers, including a post-handler similar to the callback function associated with a tracepoint. Therefore, a computer program written for the virtual machine could be attached to the kprobe.

For further example, an improvement of the extended Berkeley Packet Filter ("eBPF") provides the virtual machine as discussed above. An eBPF program, a computer program in eBPF bytecode could be attached to certain operations or conditions during execution of a monitored application, such as tracepoints or kprobes. Execution of the eBPF program is simulated within the virtual machine or otherwise verified at the code level to ensure the safety of the computer program. The simulation can include smartly pruning the input argument space to be able to catch as many violations of the safety criteria as possible within a reasonable period of time (e.g., a few seconds). The eBPF virtual machine can cause translation of the eBPF program into native kernel code after verification, and specifically at the time when it needs to be executed in the kernel (just-in-time compilation).

For further example, when an application or process reaches one of the execution points to which the computer program is attached, the computer program is then executed in the kernel. The computer program receives as arguments some relevant data coming from the execution point. The computer program can then compute some metrics from additional contextual data, such as the number of network packets transmitted, store move the relevant data or the computed metrics to a per-CPU ring buffer managed by the Linux operating system and having a size of at least 8 MB. The computer program could also initially store the collected data in an extended eBPF map managed by the eBPF virtual machine and having a size of at least 32 KB before moving a relatively large chunk of data to the per-CPU ring buffer. The size of the per-CPU buffer ring allows the monitoring component to never rely on slower I/O multiplexing mechanisms provided by the kernel, such as poll, but to instead manually check the per-CPU ring buffer for new data every few milliseconds without risking losing some data in a burst. Data storage in the per-CPU ring buffer could be performed using native eBPF functions, such as bpf_perf_event_output.

For further example, the monitoring component can upload computer program into the eBPF virtual machine by executing a eBPF system call, such as bpf, and attach the computer program to specific execution points. The monitoring component can perform the attachment by executing additional Linux system calls, such as perf_event_open, and handling several files made available by the kernel under debugfs. Subsequently, the monitoring component can open the per-CPU ring buffers by executing additional Linux system calls, such as perf_event_open.

FIG. 1 illustrates an example computing architecture for monitoring a container application comprising a monitoring component in communication with a virtual machine. Initially, a monitoring component 114 running in the user space loads a computer program 108 into the eBPF virtual machine and attaches the computer program 108 to a tracepoint or a kprobe 106. The tracepoint or kprobe 106 may correspond to the entry or exit of a system call 104. At run time, when a container application 102 to be monitored makes a system call 104, the computer program 108 could be invoked via the tracepoint 106. The computer program 108 can receive or store control messages or other values in an eBPF map 110. The computer program 108 can then also store the arguments with which it was invoked, additional data in the call stack, and container data stored in certain kernel data structures in the eBPF map 110 or directly in a per-CPU ring buffer 112. The computer program 108 can further compute various metrics from the collected data and also store the computed metrics in the eBPF map or the per-CPU ring buffer 112. On a near-continuous basis (e.g., every few milliseconds), the monitoring component 114 retrieves the data saved in the per-CPU ring buffer 112 and further process the retrieved data as appropriate. For example, the monitoring component 114 can compute additional metrics from all the data stored in the per-CPU ring buffers by one or more computer programs attached to one or more execution points and generate specific trace reports.

3.0 Example Computer Components

Figure 2A:
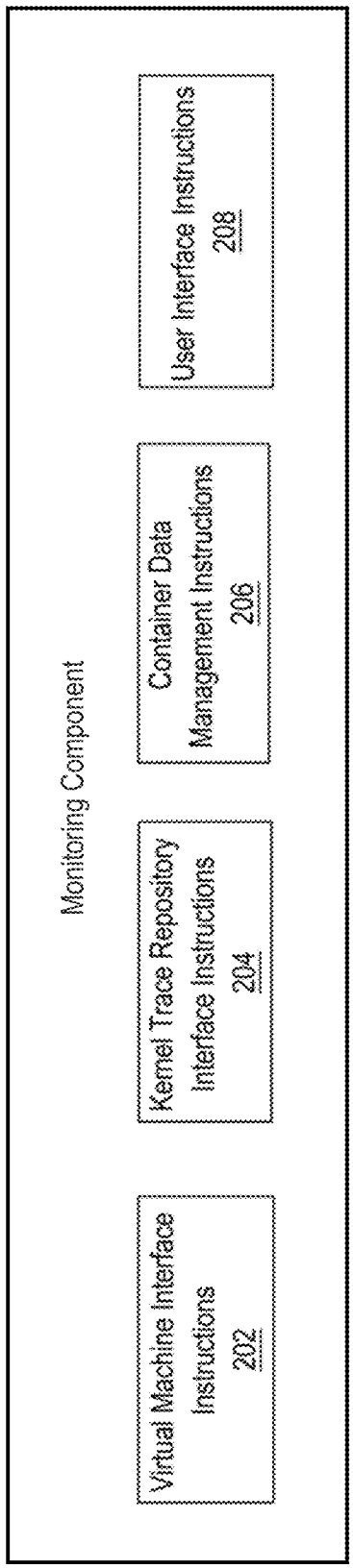
FIG. 2A illustrates example computer modules of the monitoring component.
Figure 2B:
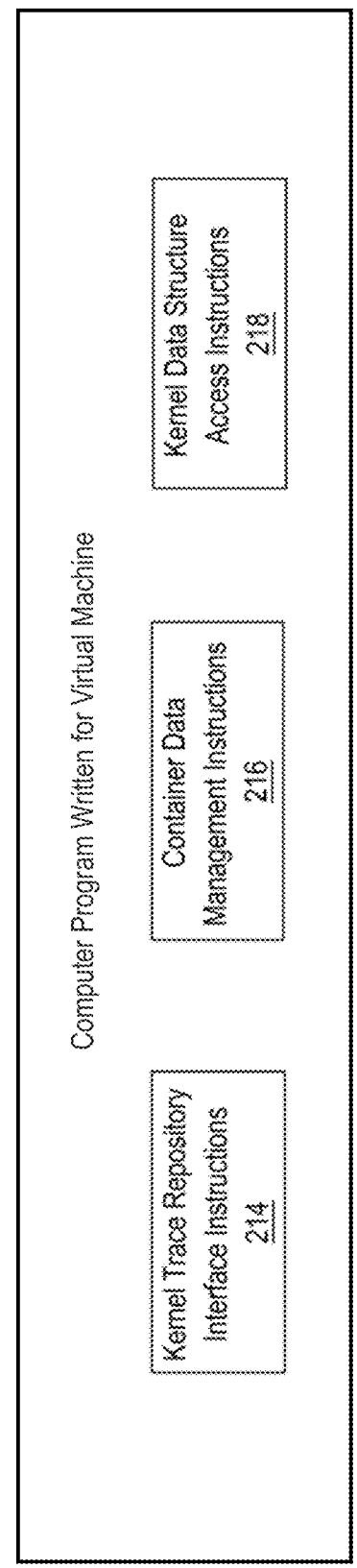
FIG. 2B illustrates example computer modules of a computer program written for the virtual machine.

FIG. 2A illustrates example computer modules of the monitoring component. FIG. 2B illustrates example computer modules of a computer program written for the virtual machine. These figures are for illustration purposes only and the monitoring component or the computer program can comprise fewer or more functional components. A component may or may not be self-contained. Depending upon implementation-specific or other considerations, the components may be centralized or distributed functionally or physically.

In some embodiments, the monitoring component comprises a virtual machine interface 202, a kernel trace repository interface 204, a container data management module 206, and a user interface 208. The virtual machine interface 202 communicates with the virtual machine, including loading a computer program to be attached to an execution point into the virtual machine for verification by the virtual machine. The kernel trace repository interface 204 accesses data stored by the computer program in the one or more memory buffers shared by the kernel space and the user space. The data generally includes trace data related to execution of a monitored container application at the execution point as well as container data related to the container of the monitored container application. The kernel trace repository interface 204 can retrieve data stored by multiple computer programs and accumulate data in a local database for further processing by the container data management module 206 and the user interface 208. The container data management module 206 associates the trace data with the container created by each computer program. The container data management module 206 can further analyze the data stored in the local database to generate container-specific trace reports. The user interface 208 communicates with a user device, including receiving request for trace reports and transmitting container-specific trace reports to the user device in response to the request.

In some embodiments, the computer program comprises a kernel trace repository interface 214, a container data management module 216, and a kernel data structure access module 218. The kernel trace repository interface 214 stores data in the one or more memory buffers shared by the kernel space and the user space. The data generally includes trace data related to execution of a process at an execution point, such as the entry or exit of a system call, and container data related to any container of the process. The trace data can include arguments received by the computer program, translations of the arguments, computed metrics, or additional data retrieved from kernel data structures. The kernel data structure access module 218 obtains the container data by performing raw access of one or more kernel data structures using safe memory access functions provided by the virtual machine. The kernel data structure access module 218 can then pass this data to the kernel trace repository interface 214 for storage. The container data management module 216 is similar to the container data management module 206 in that the module can associate the trace data with the container, translate the arguments, generate specific metrics from the arguments, or collect additional data from the call stack. In addition, the container data management module 216 sends all the collected data to the kernel trace repository interface 214 for storage.

In some embodiments, the monitoring component attaches a specific program to be run within the virtual machine to each of a plurality of execution points, such as a system call entry path, a system call exit path, a process context switch, a process termination, or a page fault. As described earlier, each specific computer program takes as input the execution point-specific data and starts processing them. The processing depends on the nature of the execution point. For an execution point corresponding to a simple system call, the input arguments are just copied verbatim into one of the memory spaces for temporary storage. For an execution point corresponding to a more complicated system call or other operations, the specific computer program can derive specific data from the input data or generate additional data to augment the input data to enable the monitoring component to fully leverage the execution point-specific data. The specific computer program can derive the specific data by collecting additional data from the call stack, such as the amount of memory usage, the frequency of page faults, or the lengths of socket queues.

In some embodiments, the specific computer program to be run within the virtual machine generates additional data by directly accessing kernel data structures. Certain relevant data, such as data specific to container applications, may be stored in the kernel data structures but not directly passed to a computer program attached to an execution point. Therefore, the specific computer program obtains the relevant data from the kernel data structures in a safe manner without sacrificing the security protection offered by the virtual machine. The additional container-specific data augments the trace data available in the call stack by providing a container context. The specific computer program could help establish an association between the container data and the trace data by storing them within the same data structure, with timestamps or identification of the computer program, and so on.

For example, on Linux, certain data related to containers, such as cgroups data and namespace data, are stored in certain kernel structures. The kernel structures are hierarchically organized structures linked with one another through memory pointers. A computer program written for the eBPF virtual machine and attached to an execution point can then navigate the certain kernel structures and dereference the relevant memory pointers using the memory access functions offered by the eBPF virtual machine, such as bpf_probe_read and bpf_probe_read_str, to obtain the relevant container data. For example, the computer program may need to navigate to a first area within the kernel data structures that contains generic cgroup data, and navigate to a second area that contains cgroup data for one or a few containers, and extract a specific container ID from the second area. The computer program can associate the container data retrieved from the certain kernel data structures with the trace data obtained during the same execution by directly attaching the container data to the trace data to enable downstream applications to recognize the container context for the trace data.

In some embodiments, the monitoring component facilitates subsequent processing of the data saved by a specific computer program written for the virtual machine by predetermining type information for such data. An input argument to the specific computer program can be a file descriptor, which can correspond to an actual file document or a network connection. It is often helpful to obtain various data associated with a network connection, and that might require an initial determination of whether a given file descriptor corresponds to a network connection. Therefore, the monitoring component can perform an initial calibration procedure to predetermine the classification of a file descriptor. Specifically, the monitoring component can invoke a system call involving either a network connection or a file document, associate the assigned file descriptor saved by the specific computer program attached to an entry or exit of the system call with the appropriate type (network connection or file document), and save such association for future reference. With this association, when a container application to be monitored is executed and a file descriptor is saved by one of a computer program attached to an execution point, the monitor component will know its type—whether the file descriptor corresponds to a network connection or a file document. The association can also be saved in a memory buffer shared by the kernel space and the user space for access by any computer program that accesses the memory buffer for monitoring purposes.

For example, on Linux, it could be helpful to obtain various data associated with a network connection, such as a TCP/UDP IPv4/IPv6 tuple or a UNIX socket name. The type information of a file descriptor is typically stored in a global variable that is initialized at boot time and cannot be accessed by any eBPF program. Therefore, the monitoring component can perform the calibration procedure discussed above following each booting of the Linux kernel to obtain the type information. Specifically, the monitoring component can issue a system call that is known to operate on a network connection, and an eBPF program attached to the entry or exit of a system call can pass to the monitoring component the received input argument that corresponds to the network connection or its association with a classification of network connection.

In some embodiments, the monitoring system is programmed or configured to package a computer program to be loaded into the virtual machine, the monitoring component, and relevant kernel development files into a single image for deployment of the monitoring component which causes the computer program to ultimately be executed in the kernel space. The computer program can be originally written in a high-level programming language. Upon launching the image, the computer program can be compiled into the virtual machine code on the fly and loaded into the virtual machine as part of the kernel. In case of a compilation failure, a pre-compiled version of the computer program can be automatically downloaded from a secure repository. Such a deployment strategy reduces manual efforts and expedites availability of desired monitoring functionality as discussed above.

For example, a computer program written for the eBPF virtual machine, the monitoring component, and relevant kernel development files can be packaged into a single container image. The relevant kernel development files can include Clang, LLVM toolchain, or other compilation tools. Upon launching the image, the presence of the kernel development files can be detected and the computer program can be compiled into eBPF code on the fly and loaded into the eBPF virtual machine as part of the Linux kernel. In the case of a compilation failure, a pre-compiled version of the computer program can be automatically downloaded from secure HTTPS repository.

4.0 Example Processes

Figure 3A:
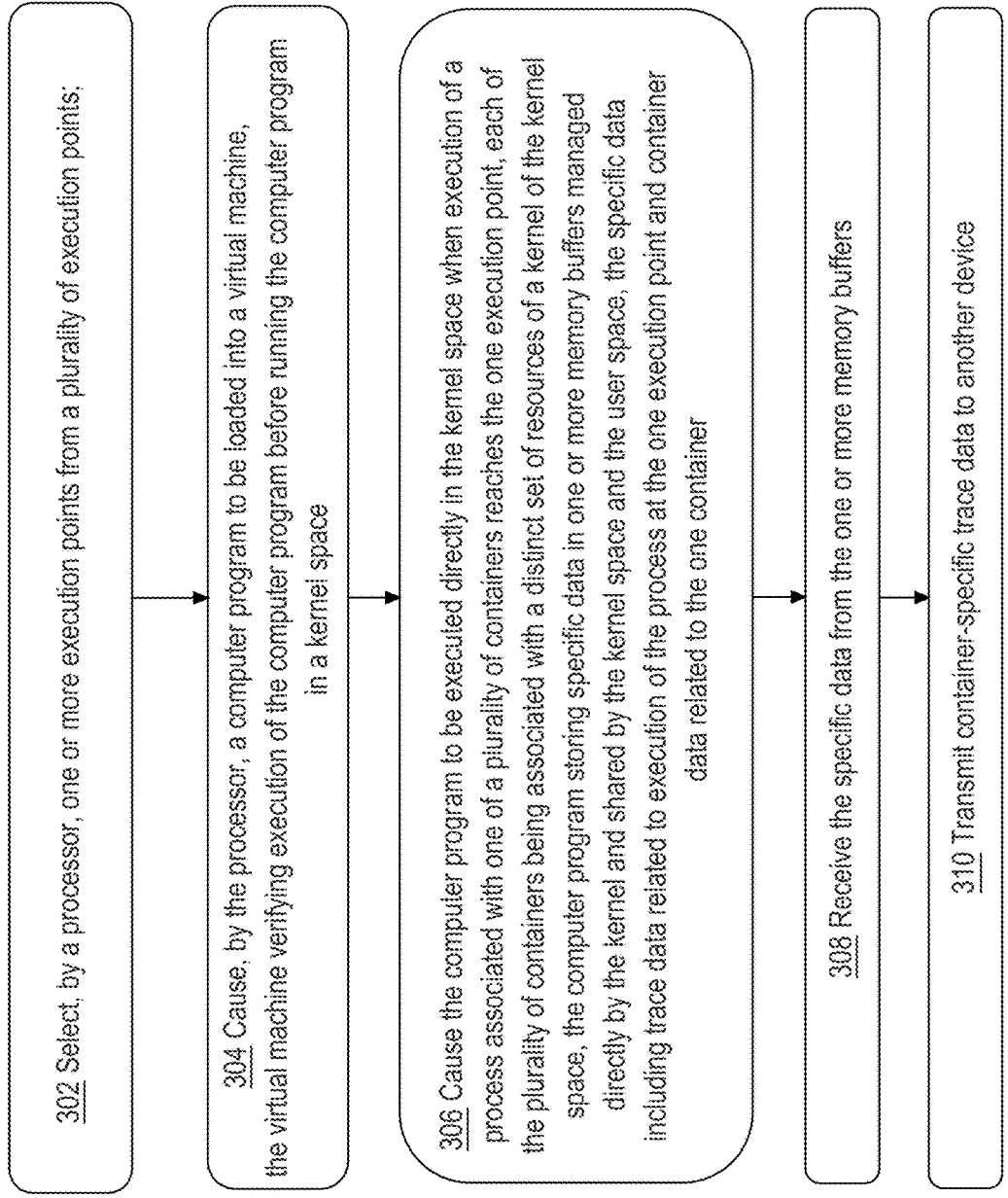
FIG. 3A illustrates an example process of monitoring container processes performed through executing a monitoring component in a user space.
Figure 3B:
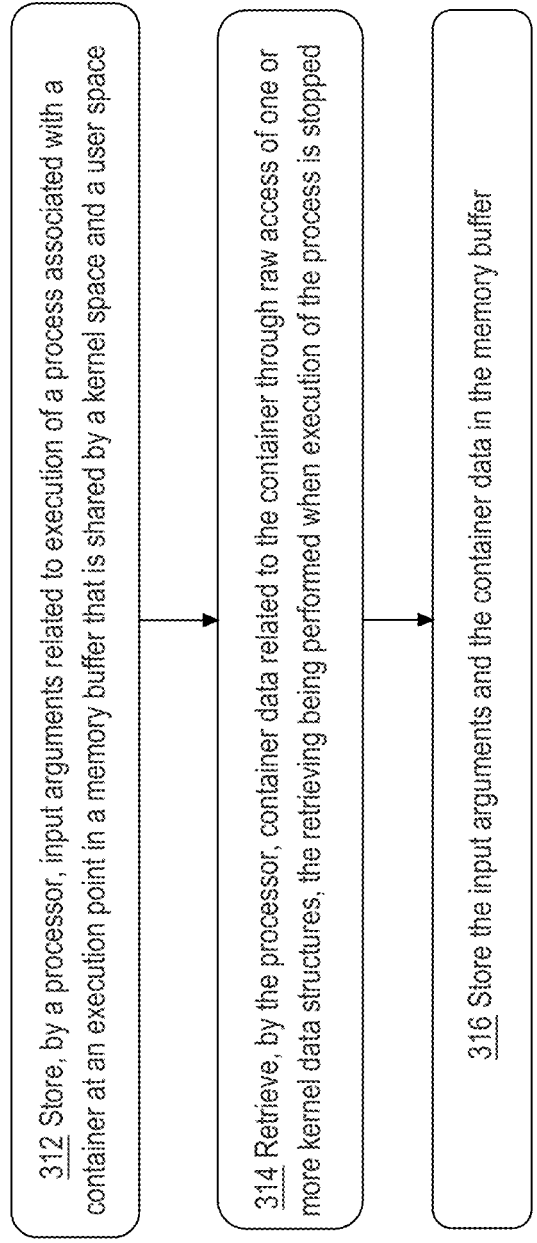
FIG. 3B illustrates an example process of monitoring container processes performed through executing a computer program in a kernel space.

FIG. 3A illustrates an example process of monitoring container processes performed through executing a monitoring component in a user space. FIG. 3B illustrates an example process of monitoring container processes performed through executing a computer program in a kernel space. FIG. 3A and FIG. 3B are shown in simplified, schematic format for purposes of illustrating a clear example and other embodiments may include more, fewer, or different elements connected in various manners. Each of FIG. 3A and FIG. 3B is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

Referring back to FIG. 3A, in step 302, the monitoring system is programmed or configured to select one or more execution points from a plurality of execution points. The selection generally covers main execution points, such as the entry and exit of a system call or the occurrence of a page fault, without introducing excessive overhead to running applications. In step 304, the monitoring system is programmed or configured to cause a computer program to be loaded into a virtual machine. The computer program and other computer programs are to be attached to the selected execution points to gather trace data at the attached execution points. The computer program is currently in virtual machine code for execution within the virtual machine. The computer program can be verified by the virtual machine at the code level or the execution level. In step 306, the monitoring system is programmed or configured to cause the computer program to be executed in the kernel space. Upon attachment to one of the execution points, the computer program is translated into kernel code before being executed in the kernel space when a running container application or process reaches the one execution point. The computer program then saves the gathered data in one or more memory buffers managed directly by the kernel and shared by the kernel space and the user space. The gathered data can include trace data related to execution of the container process at the one execution point and container data related to the container of the container process. In step 308, the monitoring system is programmed or configured to receive the data saved by the computer program in the one or more memory buffers. The received data contains both trace data and corresponding container data, which enables association of the trace data of a container application with the corresponding containers. The monitoring system can also be programmed to retrieve data from the one or more memory buffers saved by all the computer programs attached to the selected execution points and compute aggregates or other metrics of the retrieved data. In step 310, the monitoring system is programmed or configured to transmit container-specific trace data to another device for monitoring, auditing, or other similar purposes.

In some embodiments, to facilitate classification of certain trace data, such as file descriptors, the monitoring system is programmed or configured to perform an initial calibration procedure. In the initial calibration procedure, the monitoring system is programed to execute a process that reaches one of the selected execution points while opening a network connection (or a file document). The monitoring system is then programmed to associate the file descriptor stored by a computer program attached to the one execution point with the network connection (or the file document) and store the association for later use.

As discussed above, the computer program is attached to one of the selected execution points. In addition, the computer program is initially written for the virtual machine and ultimately executed in the kernel. When a container application reaches the execution point, the computer program is executed with specific arguments that depend on the nature of the execution point. For example, when the execution point is the entry of a system call, the specific arguments could be the arguments to the system call. Referring back to FIG. 3B, in step 312, the computer stores the input arguments related to execution of the container application or process at the one (attached) execution point in a memory buffer that is shared by the kernel space and a user space. While the computer program is submitted to and invoked by the virtual machine, the memory buffer accessed by the computer program could be managed directly by the kernel. In addition to the input arguments, the computer program can collect additional data from the execution context, such as data related to memory counters, socket queues, or error conditions, and store such data in the memory buffer. In step 314, the computer program retrieves container data related to a container of the container application through raw access of one or more kernel data structures. The nature of the virtual machine instructions can cause the retrieval to be performed when execution of the container process is stopped. More specifically, the computer program can navigate the one or more kernel data structures, which are the only locations storing the container data, and use safe memory access functions provided by the virtual machine to retrieve the container data. In step 316, the computer program stores the input arguments, the container data, and any other collected in the memory buffer. The computer program could store obtained data as soon as it is available. The computer program could store the obtained data in the same data structure or in other ways that enable ready association of the container data with the rest of the data collected by the computer program.

5.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
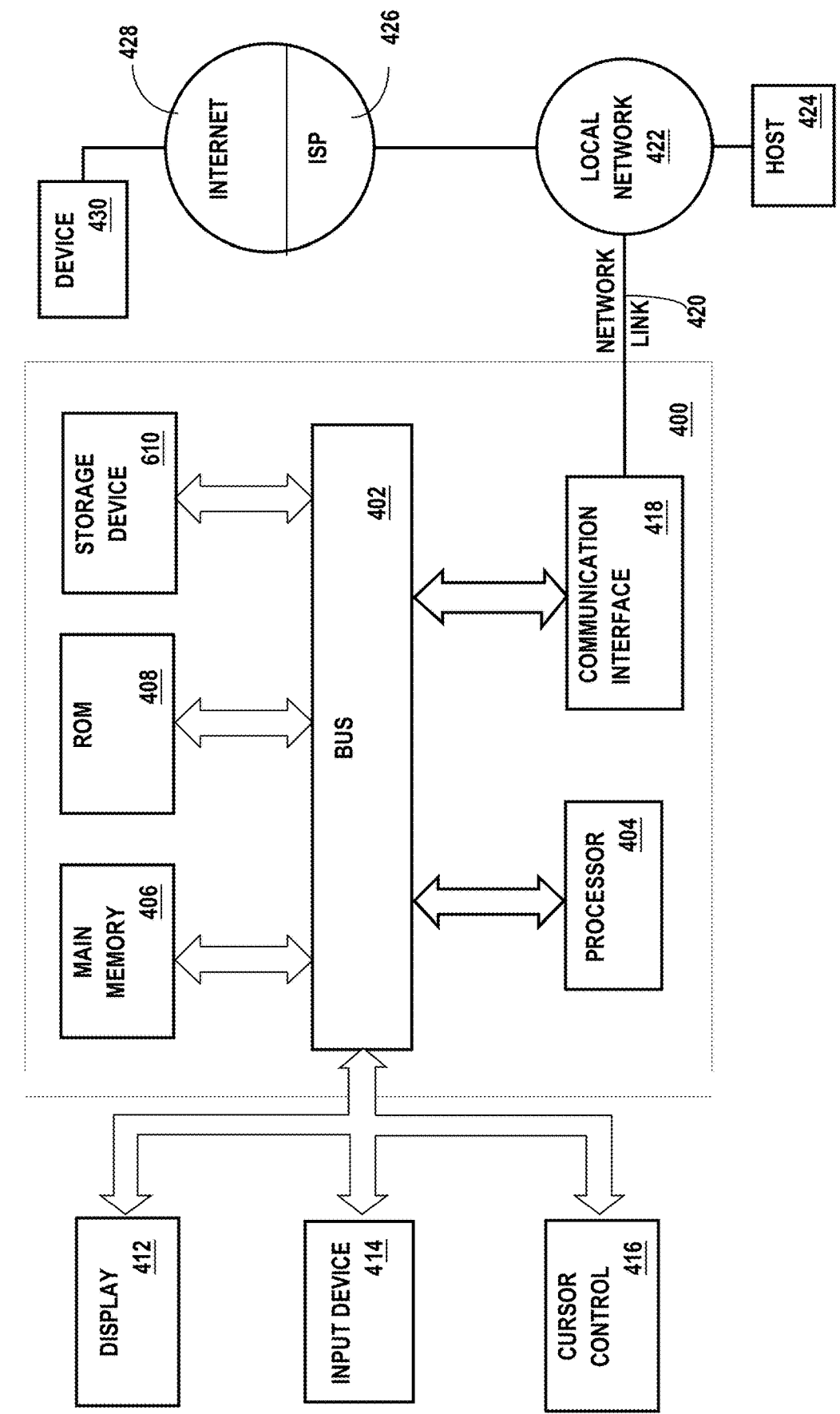
FIG. 4 depicts a computer system upon which an embodiment may be implemented.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of monitoring programmatic containers (containers) performed through executing a monitoring component in a user space, comprising:
    selecting, by a processor, one or more execution points from a plurality of execution points;
    causing a computer program to be executed directly in a kernel space of a kernel when execution of a process associated with a container of a plurality of containers reaches an execution point of the one or more execution points,
        the computer program storing specific data in one or more memory buffers managed directly by the kernel and shared by the kernel space and the user space,
        the specific data including trace data related to execution of the process at the execution point and container data identifying the container;
    receiving the specific data from the one or more memory buffers;
    transmitting container-specific trace data to another device.

2. The computer-implemented method of claim 1, the computer program reserving a small memory space of the one or more memory buffers for passing control messages and utilizing a larger memory space of the one or more memory buffers for general event streaming.

3. The computer-implemented method of claim 1, further comprising storing control messages in the one or more memory buffers for the computer program to enable or disable instrumentation for specific subsets of kernel events or to control an amount of data capture for certain types of data sources.

4. The computer-implemented method of claim 1, further comprising
    causing the computer program to be loaded into a virtual machine,
    the virtual machine verifying execution of the computer program before running the computer program in the kernel space.

5. The computer-implemented method of claim 4, the virtual machine being offered by an extended Berkeley Packet Filter (eBPF) on a Linux platform.

6. The computer-implemented method of claim 4,
    the computer program loaded into the virtual machine being in virtual machine code,
    the causing the computer program to be executed in the kernel space including compiling the computer program into kernel code.

7. The computer-implemented method of claim 4, the verifying including evaluating loops, checking for invalid memory access, or simulating execution of the computer program within the virtual machine.

8. The computer-implemented method of claim 1, the plurality of execution points including system call entry, system call exit, process context switch, process termination, page faulting, or process signal delivery.

9. The computer-implemented method of claim 1, the trace data including arguments to a system call, additional data collected from a call stack, or metrics computed from the arguments or additional data.

10. The computer-implemented method of claim 9, the additional data being related to network connections, socket queues, page faults, or memory counters.

11. The computer-implemented method of claim 1, further comprising:
    executing a specific process involving a network connection to reach a specific execution point, thereby causing a second computer program attached to the specific execution point to store a file descriptor in the one or more memory buffers;
    retrieving the file descriptor from the one or more memory buffers;
    storing an association between the file descriptor and the network connection.

12. The computer-implemented method of claim 1, the one or more memory buffers including a per-CPU ring buffer that is at least 8 MB.

13. The computer-implemented method of claim 1, the container data identifying distinct sets of resources associated with the container.

14. The computer-implemented method of claim 1, the computer program retrieving container data related to the container through raw access of a kernel data structure.

15. The computer-implemented method of claim 1, the causing the computer program to be executed directly in the kernel space comprising attaching the computer program to the execution point as a callback for a tracepoint or a handler for a breakpoint.

16. One or more non-transitory storage media storing instructions which, when executed by one or more computing devices, cause performance of a method of monitoring programmatic containers (containers) performed through executing a monitoring component in a user space, the method comprising:
    selecting one or more execution points from a plurality of execution points;

causing a computer program to be executed directly in a kernel space of a kernel when execution of a process associated with a container of a plurality of containers reaches an execution point of the one or more execution points,
   the computer program storing specific data in one or more memory buffers managed directly by the kernel and shared by the kernel space and the user space,
   the specific data including trace data related to execution of the process at the execution point and container data identifying the container;
receiving the specific data from the one or more memory buffers;
transmitting container-specific trace data to another device.

17. The computer-implemented method of claim 1, the computer program reserving a small memory space of the one or more memory buffers for passing control messages and utilize a larger memory space of the one or more memory buffers for general event streaming.

18. The computer-implemented method of claim 1, further comprising storing control messages in the one or more memory buffers for the computer program to enable or disable instrumentation for specific subsets of kernel events or to control an amount of data capture for certain types of data sources.

19. The computer-implemented method of claim 1, further comprising
causing the computer program to be loaded into a virtual machine,
the virtual machine verifying execution of the computer program before running the computer program in the kernel space.

20. A system for monitoring programmatic containers (containers) performed through executing a monitoring component in a user space, comprising:
a memory;
one or more processors coupled to the memory and configured for:
selecting one or more execution points from a plurality of execution points;
causing a computer program to be executed directly in a kernel space of a kernel when execution of a process associated with a container of a plurality of containers reaches an execution point of the one or more execution points,
   the computer program storing specific data in one or more memory buffers managed directly by the kernel and shared by the kernel space and the user space,
   the specific data including trace data related to execution of the process at the execution point and container data identifying the container;
receiving the specific data from the one or more memory buffers;
transmitting container-specific trace data to another device.

* * * * *